Dec. 17, 1963 R. E. FISCHELL 3,114,518
MAGNETIC DESPIN MECHANISM
Filed Jan. 18, 1961 3 Sheets-Sheet 1

ROBERT E. FISCHELL
INVENTOR

BY W. O. Quesenberry
Claude Funkhouser
ATTORNEYS

ROBERT E. FISCHELL
INVENTOR

BY W. O. Quesenberry
Claude Funkhouser
ATTORNEYS

R. E. FISCHELL
INVENTOR

United States Patent Office 3,114,518
Patented Dec. 17, 1963

3,114,518
MAGNETIC DESPIN MECHANISM
Robert E. Fischell, Silver Spring, Md., assignor to the United States of America as represented by the Secretary of the Navy
Filed Jan. 18, 1961, Ser. No. 83,603
13 Claims. (Cl. 244—1)

The present invention relates in general to satellite control and more particularly to structure for damping the angular motions of satellites in space.

To control the motions of an earth satellite it is necessary to have something to exert a force against. Although mechanical devices internal to the satellite make it possible to move one part of the satellite relative to another, they do not offer a system whereby the angular momentum of the structure as a whole can be altered. To accomplish a change in the angular momentum of an earth satellite, it is necessary to transfer momentum to another body. Several media are available in the environment of an earth satellite to effect this momentum transfer. Some of these media to which angular momentum could be transferred are gas molecules, photons (radiating from the sun), the earth's gravitational field and the earth's magnetic field. Of all these media for momentum transfer, the relatively large force that can be exerted on an earth satellite by means of the earth's magnetic field make it appear most feasible as a means for motional control.

Satellites are usually caused to spin about their axes as part of the launching process. This is usually required to stabilize the satellite as it is injected into orbit. However, the frequency of radio transmission from an orbiting satellite is modulated by the spin rate of the satellite. This is certainly an undesirable situation for orbiting vehicles which require a high order of frequency stability.

The invention contemplates the incorporation into an earth satellite of a number of permeable rods suitably oriented in a lattice formation such that eddy current, hysteresis, and shorted coil damping will act upon the vehicle to eliminate its angular motions.

Accordingly, it is an object of the present invention to provide apparatus through which the magnetic field of the earth can be utilized for the control of the angular motions of an earth satellite.

It is a further object of the invention to provide an apparatus of simple lattice structure for abating the rotational motion of a satellite in orbit.

It is another object of the invention to provide an apparatus for reducing the spin rate of an orbiting satellite by eddy current and hysteresis damping.

Still another object of the invention is to provide an apparatus for reducing the spin rate of an orbiting satellite by eddy current, hysteresis and shorted coil damping.

Other objects and many of the attendant advantages of this invention will be readily appreciated as the same becomes better understood by reference to the following detailed description when considered in connection with the accompanying drawings, wherein.

Figure 6:
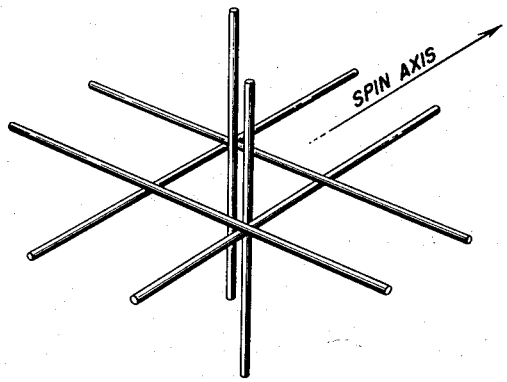
Figure 5:
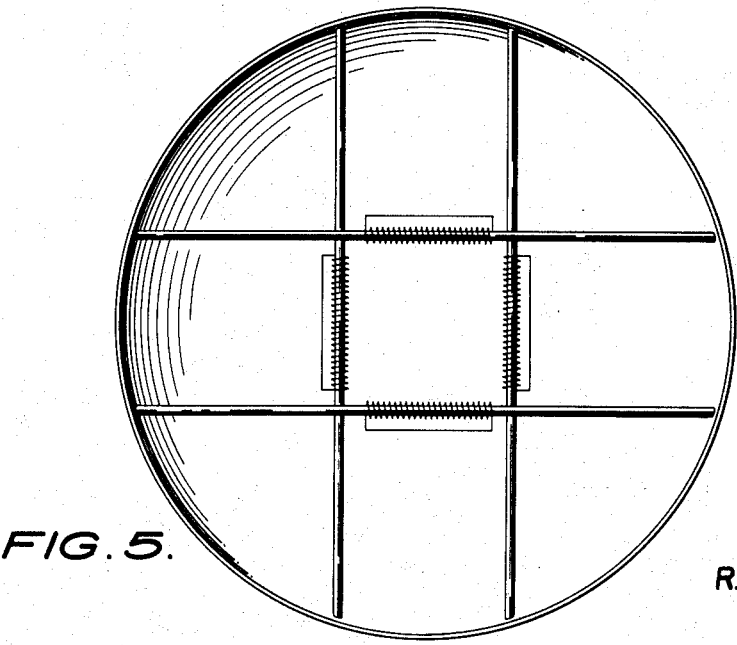

FIG. 5 discloses an embodiment of the instant invention in which shorted coils are included on the permeable rods; and FIG. 6 discloses an alternate embodiment of the instant invention.

The fact that satellite spin will be reduced as the result of eddy currents induced by the rotation of the structure in the earth's magnetic field has been established by long term observations of prior satellites. These eddy current losses depend to a great extent upon the amount of ferromagnetic material carried by the satellite. In prior satellites the eddy current damping was due almost entirely to the spinning aluminum structure of the satellite.

The inclusion of magnetic permeable materials in a satellite will considerably increase the eddy current damping. Accordingly, the invention contemplates the development of a high eddy current loss through the incorporation into a satellite of a number of permeable magnetic rods.

Figure 1:
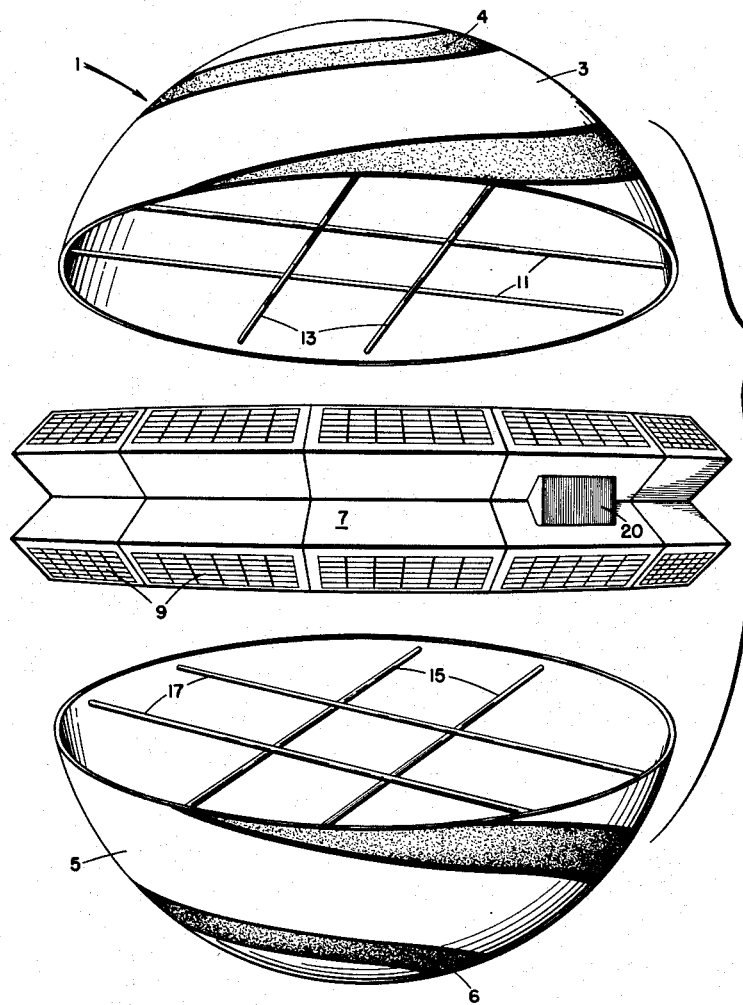
FIG. 1 is a diagrammatic representation of a satellite embodying the invention.

FIG. 1 discloses an earth satellite, indicated generally at 1, having an upper section 3, an identical lower section 5, and a central section 7, all of which when combined form a spherical body. The upper and lower sections 3 and 5 contain identical pairs of omnidirectional equiangular spiral antennas 4 and 6. Central section 7 contains two banks of solar cells 9 which extend about the entire perimeter of the section.

The invention as proposed takes the form of four pairs of permeable magnetic rods lying in two parallel planes in the upper and lower sections of the satellite. The upper section 3 contains four despin rods arranged in two mutually perpendicular pairs 11 and 13. The lower section 5 also contains four despin rods arranged in two mutually perpendicular pairs 15 and 17. The rods of each pair are arranged so as to be parallel to each other. The bars in the upper and lower sections lie in parallel planes but the longitudinal axis of pairs 15 and 17 are displaced from the longitudinal axis of pairs 11 and 13 by an angle of 45°. This orientation, as illustrated in FIG. 1, will produce maximum damping and is necessary to provide maximum separation effect which will be explained below.

The satellite 1 also contains a mechanical despin mechanism in the form of a pair of weights 20 (one not shown) located on diametrically opposite sides of the satellite on the satellite's equator. In operation the two weights are deployed on cables from opposite sides of the satellite thereby changing the moment of inertia of the rotating body and substantially reducing its spin. This mechanical despin mechanism will reduce the satellite spin rate only to a definite minimum value and when this value is reached the mechanism is released. It is then up to the permeable rods to eliminate further spin. Of course, the permeable rods may be used alone for total spin removal as will be shown below.

The spin rate as a function of time for eddy current damping can be calculated and results in the following relationship $$f = f_0 e^{-(k_e/4\pi^2 I)t} \text{(r.p.s.)} \qquad (1)$$

where $k_e$ is the damping coefficient $$k_e = 4.61\pi^2 n\rho^{-1} <B_m^2> VD^2 \times 10^{-18} \text{ (ft.-lb.-sec.)} \quad (2)$$

In the above equations
  $f_0$ = initial spin rate at time $t=0$
  $I$ = spin moment of inertia of the satellite (slug-ft.$^2$)
  $n$ = number of rods in the satellite
  $\rho$ = resistivity of the rods (ohm-cm.)
  $<B_m^2>$ = average value over an orbital period of square of the peak flux density causing eddy currents
  $V$ = volume of rod (cm.$^3$)
  $D$ = diameter of rod (cm.)

Since the spin rate as a function of time, represented by Equation 1, is an exponential function, it is clear that eddy current damping alone will not reduce the rotational motion of the satellite to zero. The spin rate will exponentially approach zero but will not reach zero in a finite time. As a result, further damping is necessary.

Fortunately, the additional damping needed to completely eliminate satellite spin may be achieved through the same permeable rods which furnish eddy current damping. These magnetic rods will remove the kinetic energy of spin by means of hysteresis damping as well as eddy current damping.

Figure 2:
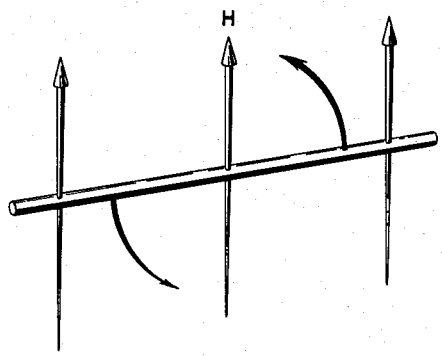
FIG. 2 is a representation of a permeable rod spinning in a magnetic field.

FIG. 2 shows a rod turning in the earth's magnetic field. As the rod rotates it experiences a magnetic field along its length which varies sinusoidally at the rate of spin and with a peak amplitude equal to the intensity of the earth's magnetic field normal to the direction of spin. As the magnetic rod undergoes changes in the magnetic field it traverses its hysteresis loop. The area of the hysteresis loop is proportional to the rate of energy loss per cycle. This rate of loss is given by the equation $$W = \frac{V}{4\pi} \int H dB \quad \text{(ergs/cycle)} \quad (3)$$

where $V$=total volume of the magnetic rods and
$\int H dB$=area of the hysteresis loop in gauss-oersteds.

For some materials the hysteresis loss is greater than for others. Materials are rated by their hysteresis loop area to determine which will provide the greatest loss for the values of magnetic field intensity encountered in orbit. Several materials have been found suitable for the purpose of the invention but AEM-4750 (an alloy of 47.5% iron) was found to have a particularly high hysteresis loss at the field intensities encountered by near earth satellites. It is to be understood that the practice of the instant invention is not limited to the use of this particular material.

It should also be recognized that the composition of the rods may be varied to alter the damping properties thereof. That is, permeable rods with various ratios of hysteresis to eddy current damping will provide more or less linear or exponential decay of the spin rate or damping.

Figure 3:
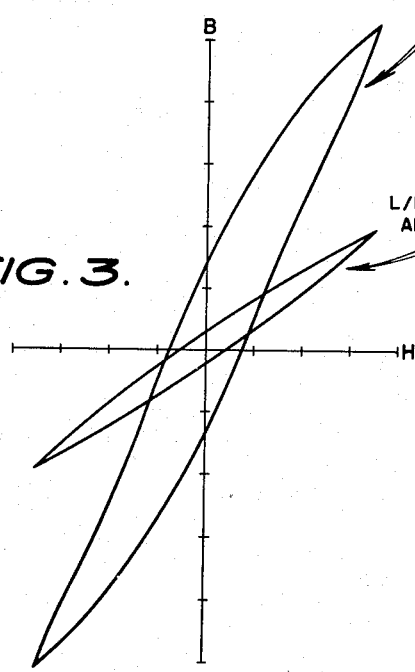
FIG. 3 is a graphical comparison of the hysteresis loops for two permeable rods having different length-to-diameter ratios.

Not only must a best material be selected for optimum hysteresis damping, but also the optimum length to diameter ratio ($L/D$) must be selected for the rods. The physical dimensions of the satellite restrict the maximum length of the permeable rods. Although total hysteresis loss in the satellite is proportional to the volume of the rods, increasing the diameter of the rod can result in a decreasing hysteresis loss due to the fact that the length to diameter ratio is also decreased. An illustration of the effect of length to diameter ratio on hysteresis loss is shown in FIG. 3. Both rods tested were of the same length. Although the permeable rod with an $L/D$ ratio of 124 had four times the volume of the rod having an $L/D$ ratio of 248, the increased hysteresis loop area of the smaller diameter caused its loss to be 20% greater on a per rod basis.

Figure 4:
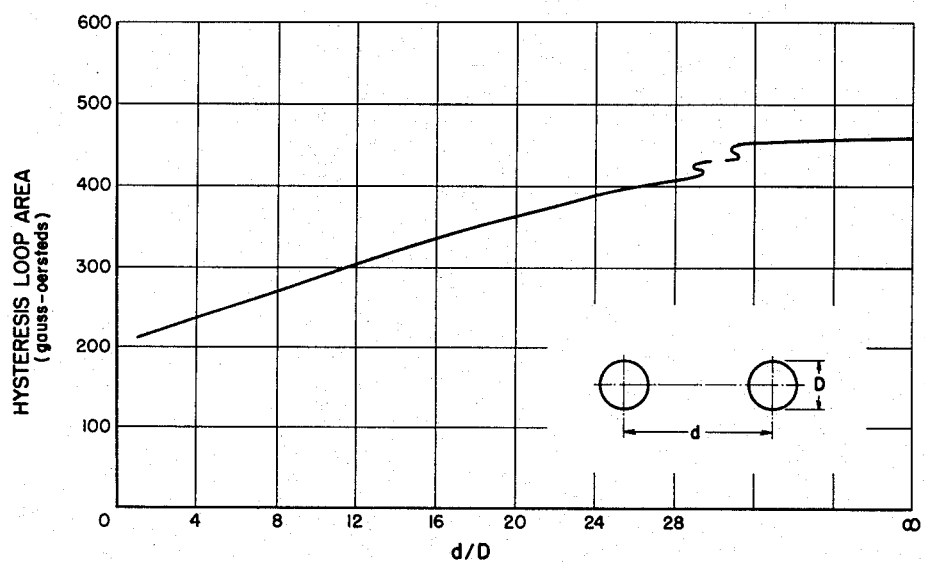
FIG. 4 is a graphical indication of the change in hysteresis loop area with increase in permeable bar separation.

Another phenomenon closely related to length to diameter ratio is termed "separation effect." If two rods are placed close together with their longitudinal axes parallel, they act somewhat as if they were one rod with a decreased $L/D$ ratio. This effect is illustrated in FIG. 4 which shows the relation between hysteresis loop area and separation distance. It is thus seen that to obtain optimum magnetic damping, one cannot merely place large numbers of thin long rods parallel and in close relation to each other.

The spin rate as a function of time for hysteresis damping is $$f = f_0 - \frac{k_h}{4\pi^2 I} t \quad \text{(r.p.s.)} \quad (4)$$

where $k_h$ is the damping coefficient $$k_h = \frac{1.844}{\pi} nV < \int H dB > \times 10^{-8} \quad \text{(ft.-lbs.)} \quad (5)$$

In the above equations $<\int H dB>$=average area of the hysteresis loop for the period of one orbit
$I$=spin moment of inertia of the satellite
$n$=number of rods in the satellite
$V$=volume of a rod (cm.$^3$)

It is seen from the above result that the angular rate of spin of the satellite will decrease linearly with time, and will actually go to zero revolutions per second (with respect to the ambient magnetic field) in a finite time. This is distinctly different from the case of eddy current (or shorted coil) damping where the spin rate decreases exponentially.

In addition to eddy current and hysteresis damping, additional damping may be achieved by including a shorted coil on each permeable rod. It is a well known fact that if the rotor of a dynamo is shorted, it will rapidly come to a stop. A satellite can be made to stop spinning in a similar manner by shorting a coil of wire that has been wound on a permeable core within the satellite structure. According to the invention the permeable rods incorporated in the satellite for eddy current and hysteresis damping may be used as the permeable core for the shorted coil.

FIG. 5 shows the embodiment of the invention utilizing the shorted coils and the general location of the coils on the permeable rods. Each of the rods should be tightly wound at its center with one hundred or more turns of enameled (Formvar) wire. The winding is to be in a single layer and should not be so tight as to stress the permeable rod. The number of turns in the coil, the coil resistance, and the size of wire used may be varied to comply with specific design considerations. The coil resistance is selected so that it is equal to the coil inductive reactance at the initial spin frequency.

To find the equation of spin rate as a function of time for shorted coil damping, the same procedure is followed as for eddy current damping. If the coil is designed to have a high resistance compared to its inductive reactance at the satellite spin rate, the spin rate as a function of time can be found by substituting $k_s$ for $k_e$ from Equation 1, therefore:

$$f = f_0 e^{-(k_s/4\pi^2 I)t} \quad \text{(r.p.s.)} \quad (6)$$

where $$k_s = 1.475 nR^{-1} N^2 A^2 <B_m^2>_s \times 10^{-16} \quad \text{(ft.-lbs.-sec.)} \quad (7)$$

In the above equations $R$=coil resistance (ohms)
$A$=cross-sectional area of the rod (cm.$^2$)
$<B_m^2>_s$=average value over an orbital period of the peak flux density linked by the shorted coil.

As in the case of eddy current damping, the spin rate decreases exponentially. The advantage of shorted coil damping is the fact that the number of turns of the coil can be made large, providing a damping coefficient many times the value of that available with eddy current damping alone.

A distinct advantage is realized through the use of a shorted coil alone to effect satellite damping. When despin has been accomplished through the use of a permeable rod, a residual moment remains in the rod. This will cause small oscillatory motions in the satellite body which are highly objectionable. If a shorted coil is used without a permeable rod to effect damping, no residual dipole moment will remain upon completion of the despin operation.

This residual dipole moment may also be minimized through the use of three sets of permeable rods (with or without shorted coils) mounted as shown in FIG. 6 along three perpendicular axes. Some of the rods will be ineffectual to damp the satellite's spin but will serve to neutralize the residual dipole moment remaining at the conclusion of the despin operation. The rods may be arranged in any manner so long as their axes are perpendicular.

The use of permeable rods with shorted coils to effect damping of satellite spin has many distinct advantages. The rods are small in overall size and therefore may be incorporated into a satellite with little loss of valuable space and little increase in weight. In addition the system contains no moving parts and requires no source of driving power making it very dependable and efficient. In general the invention provides a very simple, efficient, and dependable system for stabilizing the angular motion of satellites in space.

Obviously, many modifications and variations of the present invention are possible in the light of the above teachings. It is therefore to be understood that within the scope of the appended claims the invention may be practiced otherwise than as specifically described.

What is claimed is:

1. A space vehicle having a spherical body, and magnetic means within the sphere for eliminating angular rotation of the space vehicle in orbit, said means comprising a plurality of permeable magnetic rods.

2. A space vehicle as recited in claim 1 wherein each of said rods has a shorted coil wound about its center portion.

3. A despin mechanism for an earth satellite, comprising a first set of permeable rods and a second set of permeable rods lying in parallel planes within the satellite, and a shorted coil wound about the center portion of each permeable rod.

4. A despin mechanism for an earth satellite, comprising a first pair of parallel permeable rods, a second pair of parallel permeable rods perpendicular to said first pair of rods and contiguous thereto, each of said permeable rods having a length to diameter ratio greater than 100 and the rods of each pair being spaced from each other by a predetermined amount.

5. A despin mechanism for an earth satellite, comprising a first lattice of permeable rods and a second lattice of permeable rods, said first lattice and said second lattice lying in spaced parallel planes within the body of the satellite and being angularly disposed by 45° with respect to each other, said permeable rods having a length to diameter ratio of greater than 100.

6. A despin mechanism as recited in claim 5, wherein each lattice is composed of two mutually perpendicular pairs of rods, the rods of each pair being separated by a distance in excess of 30 rod diameters.

7. In a space vehicle of spherical shape, a despin mechanism comprising a first lattice of permeable magnetic rods lying in a plane above the equator of the sphere and a second lattice of permeable magnetic rods lying in a plane below the equator of the sphere, the upper plane and the lower plane being parallel to each other and to the plane through the equator of the sphere, each lattice being composed of two mutually perpendicular pairs of parallel rods, each rod having a length to diameter ratio greater than 100.

8. A despin mechanism as recited in claim 7, wherein a shortened coil is wound on the center portion of each of the rods.

9. A despin mechanism as recited in claim 8 wherein the lower lattice is rotatably displaced with respect to the upper lattice by an angle of 45° and the rods of each pair are separated by a distance equal to at least 30 rod diameters.

10. A space vehicle comprising a spherical body having an upper section, a lower section, and a ring-like center section, said upper and lower sections each containing a first and second pair of permeable rods, said first pair in each section being positioned so as to be mutually perpendicular to said second pair of rods, said upper pairs and said lower pairs lying in spaced parallel planes with the longitudinal axes of the lower pairs displaced from the longitudinal axes of the upper pairs by an angle of 45°, the rods of each pair being separated by at least 30 rod diameters, and a shorted coil wound on the center portion of each rod.

11. An earth satellite having a spherical body, and a helical coil of wire having its ends connected in short circuit relationship mounted within the spherical body with its axis perpendicular to the spin axis of the body for eliminating angular rotation of the satellite in orbit.

12. A despin apparatus for earth satellites comprising three pairs of parallel permeable rods mounted within the satellite body along three mutually perpendicular axes.

13. A despin apparatus as defined in claim 12, wherein each rod has a shorted coil of wire wound about its center.

References Cited in the file of this patent

UNITED STATES PATENTS

| 1,695,391 | Schou | Dec. 18, 1928 |
| 2,020,796 | Norris | Nov. 12, 1935 |
| 2,461,053 | Granat | Feb. 8, 1949 |
| 3,057,579 | Cutler et al. | Oct. 9, 1962 |

OTHER REFERENCES

Advances in Space Science, vol. 2, 1960, Academic Press, N.Y.

Tiros I Spin Stabilization Astronautics, vol. 5, No. 6, June 1960, pages 38, 39.

The Transit Program, Astronautics, vol. 5, No. 6, June 1960, pages 30, 31, 104, 105.